US008877150B1

(12) United States Patent
Fan et al.

(10) Patent No.: US 8,877,150 B1
(45) Date of Patent: Nov. 4, 2014

(54) SINGLE-STEP PROCESS FOR THE SIMULTANEOUS REMOVAL OF $CO_2$, $SO_x$ AND $NO_x$ FROM A GAS MIXTURE

(71) Applicant: The Ohio State University, Columbus, OH (US)

(72) Inventors: Liang-Shih Fan, Columbus, OH (US); Niranjani Deshpande, Columbus, OH (US); Nihar Phalek, Columbus, OH (US)

(*) Notice: Subject to any disclaimer, the term of this patent is extended or adjusted under 35 U.S.C. 154(b) by 0 days.

(21) Appl. No.: 13/952,004

(22) Filed: Jul. 26, 2013

(51) Int. Cl.
*B01D 53/50* (2006.01)
*B01D 53/56* (2006.01)
*B01D 53/60* (2006.01)
*B01D 53/62* (2006.01)

(52) U.S. Cl.
CPC ............... *B01D 53/60* (2013.01); *B01D 53/62* (2013.01)
USPC ... 423/210; 423/230; 423/239.1; 423/244.07; 502/20

(58) Field of Classification Search
CPC ...... B01D 53/34; B01D 53/50; B01D 53/508; B01D 53/56; B01D 53/60; B01D 53/62
USPC ............. 423/210, 230, 239.1, 244.07; 502/20
See application file for complete search history.

(56) References Cited

U.S. PATENT DOCUMENTS

| 5,591,417 | A | * | 1/1997 | Buchanan et al. ............ 423/210 |
| 7,067,456 | B2 | | 6/2006 | Fan et al. |
| 7,618,606 | B2 | | 11/2009 | Fan et al. |
| 7,837,975 | B2 | | 11/2010 | Iyer et al. |
| 7,906,086 | B2 | * | 3/2011 | Comrie ........................ 423/210 |
| 8,226,917 | B2 | | 7/2012 | Fan et al. |
| 8,496,909 | B2 | | 7/2013 | Ramkumar et al. |
| 8,501,105 | B2 | | 8/2013 | Fan et al. |
| 8,512,661 | B2 | * | 8/2013 | Fan et al. ..................... 423/230 |
| 2014/0154162 | A1 | | 6/2014 | Fan et al. |

OTHER PUBLICATIONS

Bohlbro, Hans., An Investigation on the Kinetics of the Conversion of Carbon Monoxide with Water Vapor over Iron Oxide Based Catalysts, 1969, Copenhagen.
Nakagawa, K., A Novel CO2 Absorbents using Lithium-containing Oxides, Carbon Dioxide Capture Workshop at NETL, Pittsburgh, Feb. 2003.
Turkdogan, E.T. et al., Desulfurization of Limestone and Burnt Lime, Society of Mining Engineers, Mar. 1973, vol. 254.
Ullmann, G., Encylcopedia of Industrial Chemistry, 1993, pp. 179-242, vol. A12.

* cited by examiner

*Primary Examiner* — Timothy Vanoy
(74) *Attorney, Agent, or Firm* — Standley Law Group LLP

(57) ABSTRACT

A method for the removal of $CO_2$, $SO_x$ and $NO_x$ in a single-step process is described herein. A gas mixture is directed to a carbonator. A carbonaceous material and calcium sorbent is then injected into the carbonator to remove the $CO_2$, $SO_x$ and $NO_x$. A calciner is provided to regenerate the calcium sorbent. The unreacted carbonaceous material is used to fuel the calciner.

19 Claims, 5 Drawing Sheets

SINGLE-STEP PROCESS FOR THE SIMULTANEOUS REMOVAL OF $CO_2$, $SO_x$ AND $NO_x$ FROM A GAS MIXTURE

TECHNICAL FIELD

Exemplary embodiments of the present invention relate to the removal of $CO_2$, $SO_x$, and $NO_x$ from a gas mixture. More particularly, exemplary embodiments of the present invention relate to the removal of $CO_2$, $SO_x$, and $NO_x$ from a gas mixture in a single-step process.

BACKGROUND AND SUMMARY OF THE INVENTIVE CONCEPT

The increase in anthropogenic emissions has been accompanied in recent years with an increase in research efforts to curb them. Along with criteria pollutants such as oxides of sulphur ($SO_x$) and oxides of nitrogen ($NO_x$), a lot of emphasis has also been placed on reducing the $CO_2$ emission from stationary sources of these pollutants, such as coal-fired power plants.

Traditional techniques for $NO_x$ control include: combustion furnace modifications such as low $NO_x$ burners; flue gas recirculation; reburning of the fuel such as coal; staged combustion; post-combustion $NO_x$ reduction such as selective non-catalytic reduction (SNCR) and selective catalytic reduction (SCR); and other similar technologies. The post-combustion $NO_x$ reduction technologies convert NO to nitrogen ($N_2$) in a reducing atmosphere in the presence or absence of a catalyst.

Carbonaceous material has been studied extensively for removal of NO from combustion exhaust gases. The carbonaceous material such as coal or char provides a reducing atmosphere for the $NO_x$ gas, by getting oxidized to CO or $CO_2$, and reducing $NO_x$ to $N_2$. The presence of oxygen ($O_2$) in the gaseous mixture enhances the NO reduction. The C-oxygen reaction is favored over C—NO reaction; however, the C-oxygen reaction results in the formation C(O) and C($O_2$) complexes, which when desorbed from the surface, result in active sites on the carbon surface. These active sites are then used for the C—NO dissociative chemisorption, which subsequently leads to the escape of the adsorbed N as gaseous $N_2$. Therefore, the $O_2$ present in coal combustion flue gas aids the reduction of $NO_x$.

Further, carbonaceous material impregnated with alkali and alkaline earth metals (such as Na, K, Ca) and some transition metals (Cu, Ni, Co, Fe) is known to catalyze NO reduction by carbonaceous material. The mineral matter present inherently in coal char also catalyzes the NO reduction. The metal oxides provide binding sites for the oxygen which facilitates the reaction between C and O. Thus, there exists a multitude of research on several parameters—the different types of metal oxides present in the carbonaceous material such as char, amount of their loading, effect of the various other gaseous species involved such as $SO_x$, $O_2$, $CO_2$, etc. on the overall NO reduction.

$NO_x$ reduction by using carbonaceous materials derived from different coal types (bituminous, lignite, etc.) has been extensively studied at The Ohio State University ("OSU"). The OSU-patented CARBONOX process was developed as a result of these studies, and was successfully demonstrated at the pilot scale.

OSU's recent research efforts have also led to the development of the Carbonation-Calcination Reaction (CCR) Process for removal of $CO_2$ and $SO_2$ from coal-combustion flue gas. The CCR Process makes use of a calcium-based sorbent to simultaneously capture $CO_2$ and $SO_2$. In this process, calcium oxide (CaO) reacts with $CO_2$ to form $CaCO_3$. The $CaCO_3$ is then decomposed in another reactor to release high-purity $CO_2$ for sequestration and regenerate the CaO. CaO also reacts with $SO_2$ in the presence of $O_2$ to form $CaSO_4$. Since $CaSO_4$ does not decompose at the CCR operating conditions, a purge stream of solids is maintained to avoid $CaSO_4$ build-up in the solids loop. The CCR Process has also been demonstrated at 120 kWth subpilot scale.

The novel invention described herein was successful in combining the two technologies—CARBONOX and CCR—to form a novel process for the simultaneous removal of $CO_2$, $SO_x$ and $NO_x$ from a gas mixture in general and coal-combustion flue gas in particular. In this novel process, a calcium sorbent and a carbonaceous material (like char, etc) will be contacted with the flue gas in a single reactor at an appropriate temperature and hence, simultaneous removal of $CO_2$, $SO_x$ and $NO_x$ will be achieved in a single step. $NO_x$ reduction can be ensured by the addition of excess carbonaceous material, and the unreacted carbonaceous material will be used as a fuel in the second reactor to drive the endothermic regeneration reaction of the calcium sorbent.

Exemplary embodiments according to the inventive concept are an advancement over the prior art. As stated herein, embodiments of the inventive concept combines the removal of $CO_2$, $SO_x$ and $NO_x$ into a single step. In the exemplary process of the inventive concept, a carbonaceous material is introduced into a carbonator. A sorbent, metal oxide preferably CaO, is also introduced into the carbonator. The product of the carbonator is then fed to a particle collection device wherein the clean flue gas is separated from the solids ($CaCO_3$, $CaSO_4$, unreacted char, and unreacted sorbent (CaO)). The solids are then directed to a calciner. The unreacted char will be combusted in oxy-combustion mode to supply heat for the endothermic sorbent regeneration reaction.

After the calciner, another PCD is provided that is used to separate the high-purity $CO_2$ stream from the solids exiting the calciner. The regenerated sorbent exiting the calciner may proceed directly to the carbonator or the regenerated sorbent may be directed to a hydrator before entering the carbonator. A purge and make-up stream may also be used in the inventive process.

The introduction of carbonaceous material into the carbonator also provides advantages over the prior art. Specifically, the excess carbonaceous material added to the carbonator can be used as fuel in the calciner. This reduces the coal requirement due to the heat produced by the combustion of the excess carbonaceous material. In addition, the exothermicity of carbonaceous material combustion also enables lower inlet flue gas temperatures resulting in greater heat recovery in the steam turbine cycle prior to the carbonator. Accordingly, not only are embodiments of the inventive concept removing $CO_2$, $SO_x$ and $NO_x$ simultaneously, but the carbonaceous material is helping to increase the efficiency of the calciner by providing fuel.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

In the CCR Process previously developed and patented by OSU, CaO enters the carbonator which operates in the temperature range of 500-700° C. (depending on the $CO_2$ concentration in the flue gas and the extent of $CO_2$ removal required). In the carbonator, $CO_2$ and $SO_2$ are removed by CaO as per the following reactions:

$$CaO + CO_2 \rightarrow CaCO_3$$

$$CaO + SO_2 + \tfrac{1}{2}O_2 \rightarrow CaSO_4$$

The gas-solid mixture from the carbonator is sent to a particle capture device ("PCD") to separate the clean flue gas (i.e. flue gas minus $CO_2$ and $SO_2$) from the solids. The solids, which are a mixture of $CaCO_3$, $CaSO_4$ and (unreacted) CaO, are sent to the calciner. In the calciner (operating at >850° C.), CaO is regenerated as per the following reaction:

$$CaCO_3 \rightarrow CaO + CO_2$$

Figure 1:
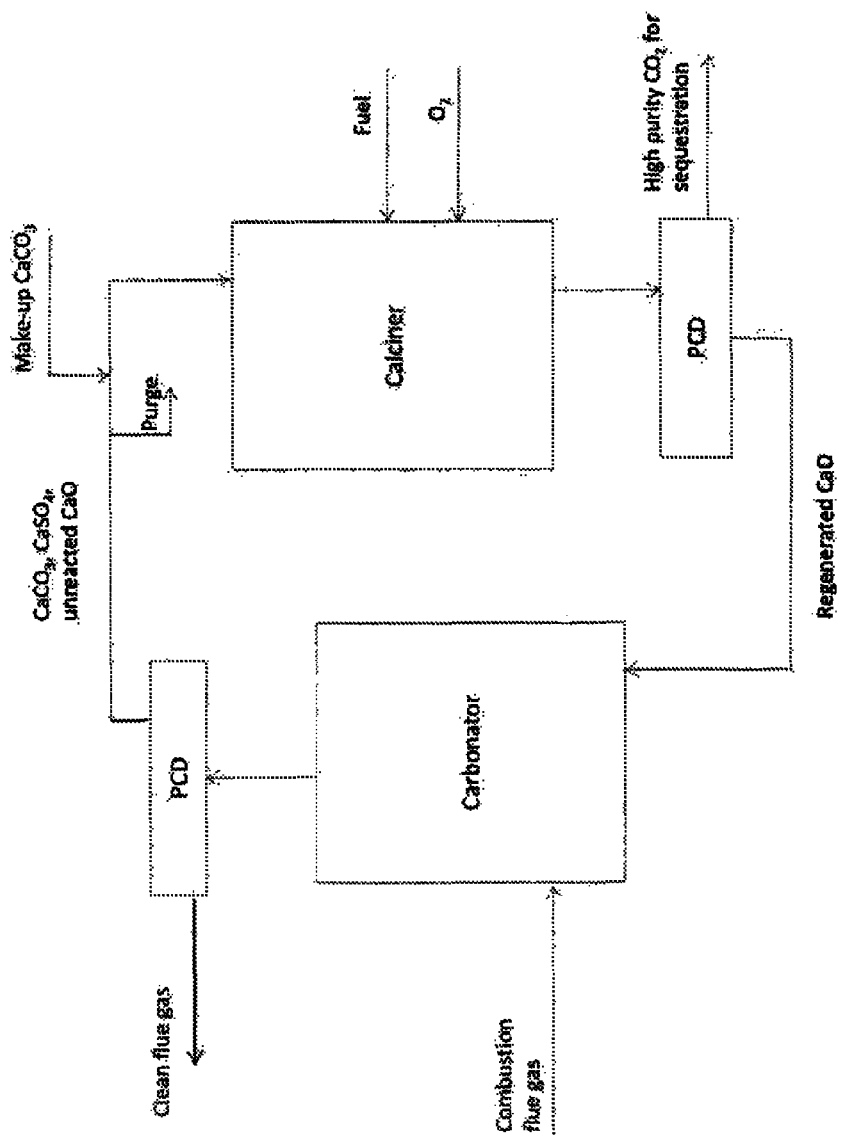
FIG. 1 is a schematic depiction of the CCR process.

The above reaction is endothermic and the required energy (heat) is supplied by combusting a fuel (coal, etc.) in an $O_2$-enriched environment. Combustion in an $O_2$-enriched environment (also called 'oxy-combustion') is necessary to generate high-purity $CO_2$ in the gas phase, in the calciner. $CaSO_4$ remains unaffected in the calciner. To avoid the build-up of $CaSO_4$ (and other inert material like coal-ash, etc.), a solid purge stream is maintained at any appropriate location in the CCR Process. Another PCD is used to separate the high-purity $CO_2$ from the regenerated calcium sorbent at the exit of the calciner. The regenerated sorbent (mainly CaO) is recycled back to the carbonator. A make-up stream (consisting of fresh calcium sorbent) is necessary to account for the purged solids. FIG. 1 shows the CCR Process.

Figure 2:
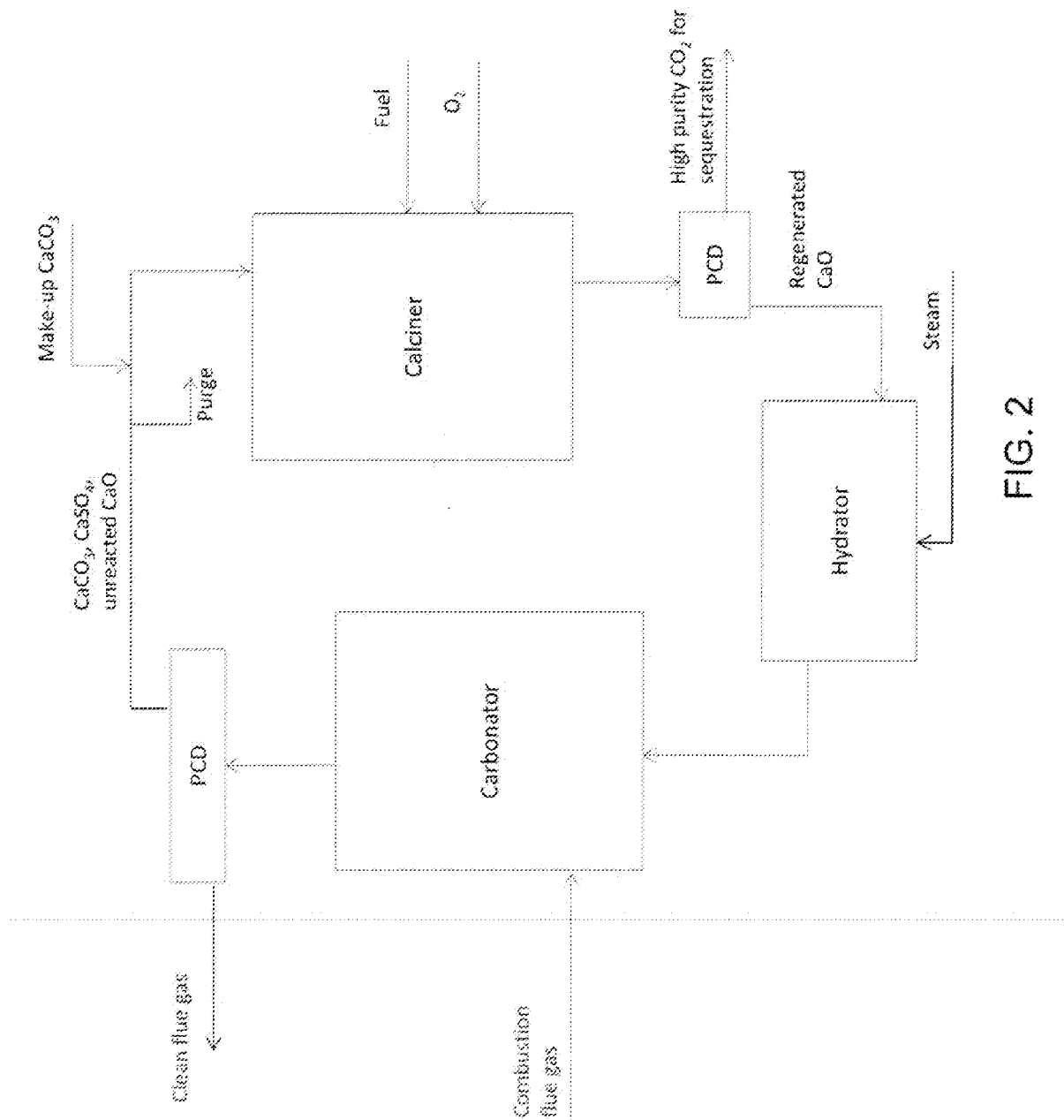
FIG. 2 is a schematic depiction of the CCR process having a hydrator to assist in the regeneration of the sorbent.

FIG. 2 depicts the CCR Process with intermediate hydration. The hydrator makes the original CCR Process a 3-step process, including: carbonation; calcination; and hydration. The hydration step reactivates the sorbent every cycle and helps to maintain the sorbent reactivity. The CCR hydrator is a high temperature (>350° C.) steam hydrator. The following reaction occurs in the hydrator:

$$CaO + H_2O \rightarrow Ca(OH)_2$$

The inclusion of the hydrator adds one more (following) reaction to the set of reactions occurring in the carbonator:

$$Ca(OH)_2 \rightarrow CaO + CO_2$$

As discussed above, the exemplary method of simultaneously removing $CO_2$, $SO_2$, and NO will be described with reference to FIG. 3. In the novel process, a carbonaceous material 10, such as coal char, will be introduced in the carbonator 20 along with the calcium sorbent (CaO) 30. Although coal char is discussed herein, it should be understood that various types of carbonaceous materials 10 may be used, such as char, activated carbon, and other similar materials. With the introduction of a carbonaceous material 10, such as coal char, the following reactions will occur in the carbonator 20, resulting in the removal of $CO_2$, $SO_2$ and NO:

$$C + 2NO \rightarrow CO_2 + N_2$$

$$2C + 2NO \rightarrow 2CO + N_2$$

$$CaO + CO_2 \rightarrow CaCO_3$$

$$CaO + SO_2 + \tfrac{1}{2}O_2 \rightarrow CaSO_4$$

The ability to remove $CO_2$, $SO_2$ and NO in a single step eliminates the need for additional $NO_x$ control or reduction systems to be installed upstream of the carbonator 20 described herein.

The post-carbonator PCD 40 will separate the clean flue gas 50 (i.e. flue gas minus $CO_2$, $SO_2$, and NO) from the solids 60—a mixture of $CaCO_3$, $CaSO_4$, (unreacted) CaO 30 and (unreacted) carbonaceous material 10. These solids will be sent to the calciner 70. Like in the original CCR Process, developed by OSU, coal (or any other fuel) will be combusted in oxy-combustion mode to supply heat for the endothermic sorbent regeneration reaction:

$$CaCO_3 \rightarrow CaO + CO_2$$

However, in this invention described herein, besides the main fuel (coal, etc), the carbonaceous material 10 will also act as a fuel and get combusted in the calciner 70. A second PCD 80, post-calciner 70, will be used to separate the high-purity $CO_2$ stream 90 from the solids. As in the CCR Process originally developed by OSU, a purge 100 and make-up stream 110 of $CaCO_3$ will be incorporated in this invention too.

Figure 4:
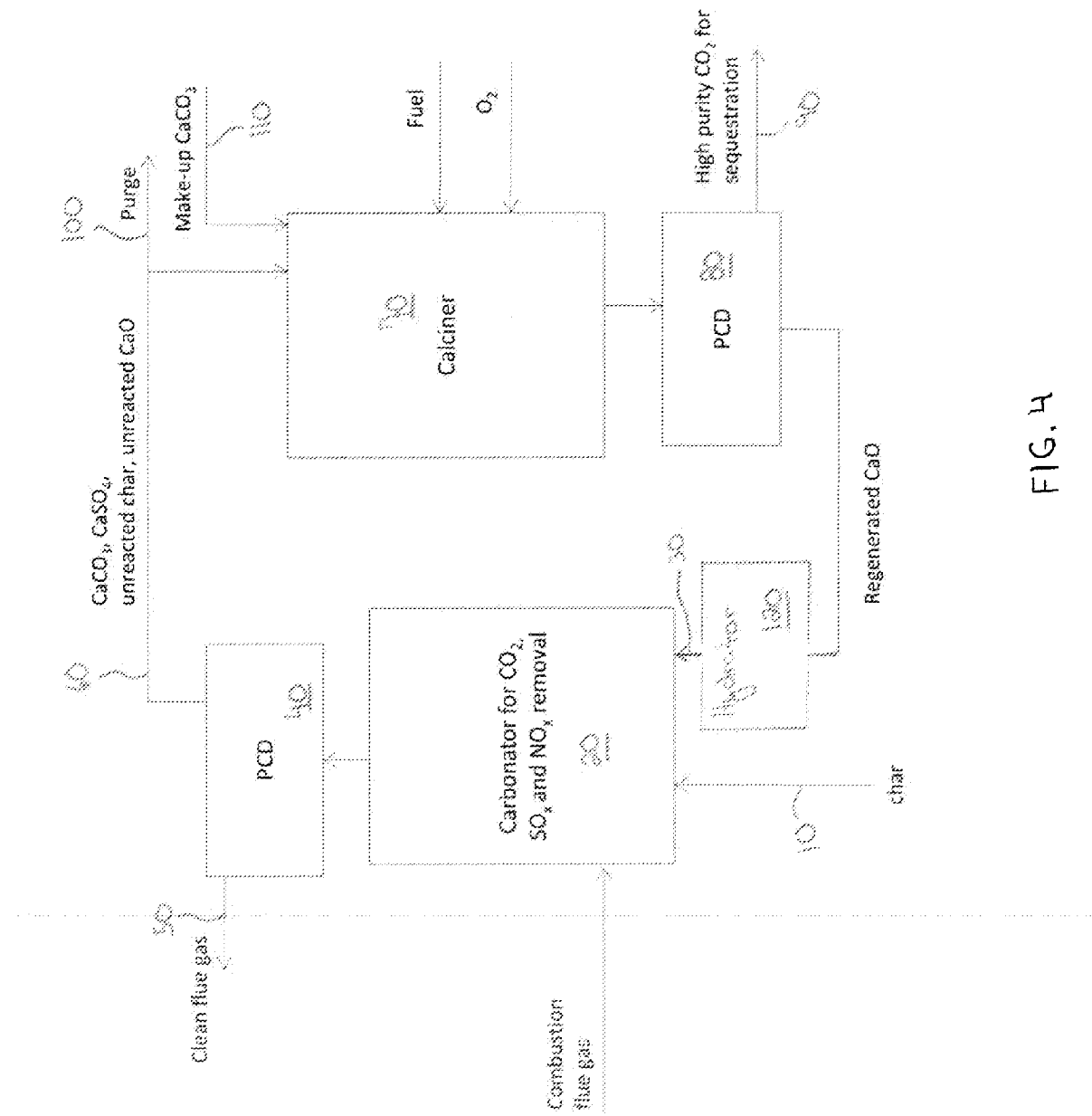
FIG. 4 is a schematic depiction of an exemplary embodiment according to the inventive concept, wherein carbonaceous material and calcium sorbent are introduced into the carbonator for the simultaneous removal of $CO_2$, $SO_x$ and $NO_x$, and having a hydrator.

In other exemplary embodiments according to the inventive concept, a hydrator 120 may also be included between the second PCD 80 and carbonator 20, as illustrated in FIG. 4. In such a configuration, it is important to note that the carbonaceous material 10 will not pass through the hydrator 120 because the carbonaceous material 10 is being added in the carbonator 20 and is eliminated, due to combustion, in the calciner 70. Even if some carbonaceous material 10 escapes combustion in the calciner 70, its presence in the hydrator 120 is not expected to affect the performance of the hydrator 120 or the process in general.

Figure 3:
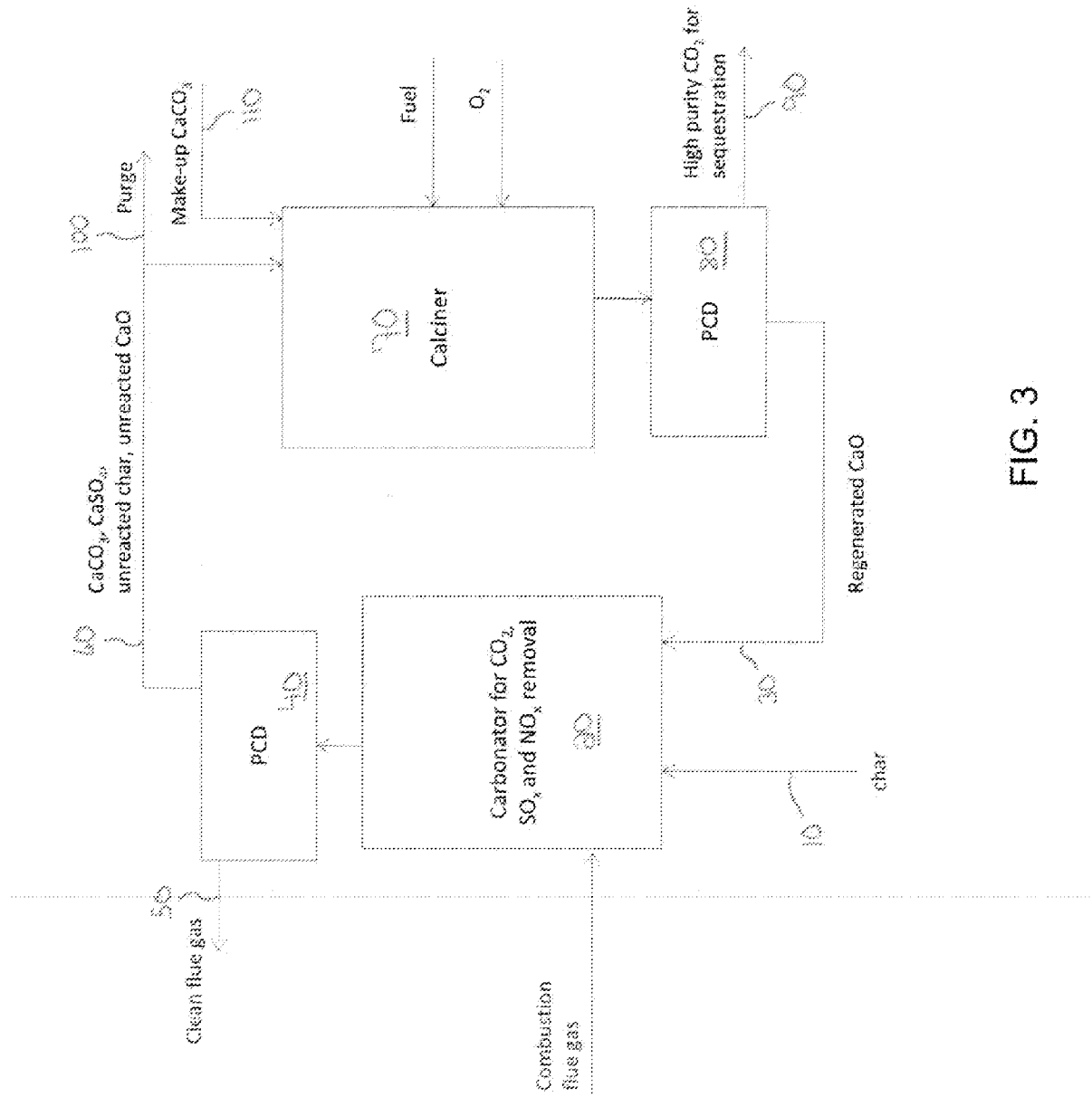
FIG. 3 is a schematic depiction of an exemplary embodiment according to the inventive concept, wherein carbonaceous material and calcium sorbent are introduced into the carbonator for the simultaneous removal of $CO_2$, $SO_x$ and $NO_x$.

Although FIGS. 3 and 4 illustrate schematics of the exemplary system, it should be understood that variations may be made thereto while still maintain the novel features of the exemplary embodiment. In one modification the carbonaceous material 10 and sorbent 30 may be added as independent streams to the carbonator 20, or alternatively the carbonaceous material 10 and the sorbent 30 may be pre-mixed before entering the carbonator 20. It should also be understood that sorbent 30 may be loaded onto the surface of the carbonaceous material 10 in small quantities by using methods such as solution impregnation.

The location of the purge 100 and make-up streams 110 may be moved while maintaining the novel features of the inventive concept. Other features as well may be altered such as heat integration strategies. In some embodiments, the reactors 20, 70, 120 may be operated under pressure, but atmospheric pressure operation will be the most likely and inexpensive option. The oxygen environment may also be controlled in the carbonator 20. The flue gas composition may be modified upstream of the carbonator 20 to control or limit the $O_2$ concentration so as to inhibit formation of unwanted species.

Figure 5:
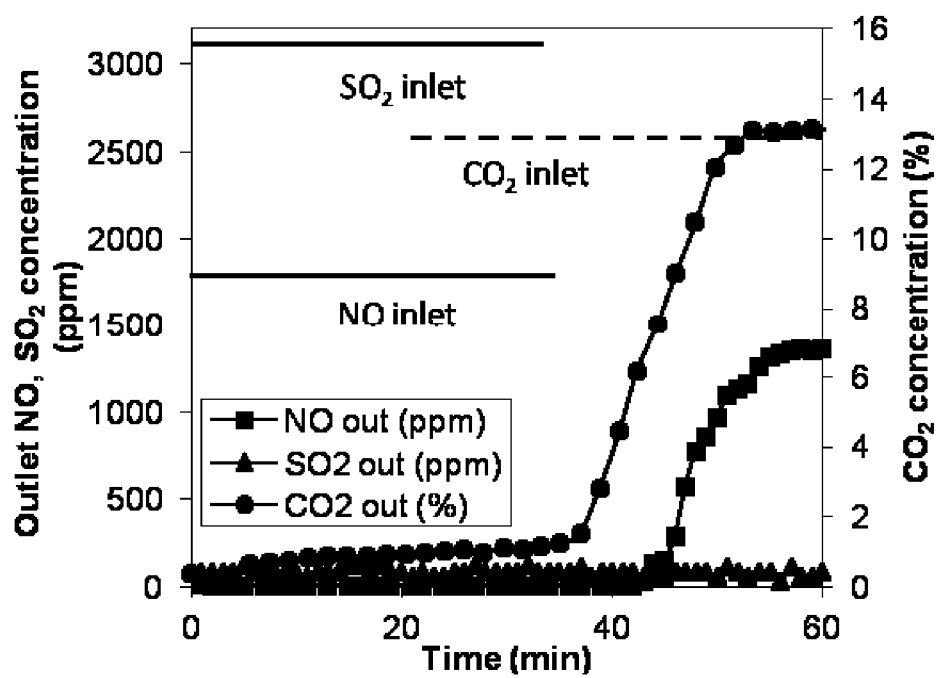
FIG. 5 is a diagram evidencing the simultaneous removal of NO, $SO_2$, and $CO_2$ from a simulated gas mixture using the exemplary method of the inventive concept described herein.

Directing attention to FIG. 5, a diagram is provided evidencing the simultaneous removal of NO, $SO_2$, and $CO_2$ from a gas mixture using the inventive method described herein. To determine the effectiveness of the exemplary method at removing unwanted components an experiment was developed; the results of which are shown in FIG. 5. To determine the effectiveness of the inventive method a fixed bed experiment was set-up where a gas mixture containing NO, $SO_2$, and $CO_2$ (similar to a flue gas stream in a power plant) was exposed to calcium sorbent and pulverized lignite coal char. The experiment had the following inlet concentrations: 13% $CO_2$; 1800 ppm NO; 3050 ppm $SO_2$; and 1.5% $O_2$. The calcium to char loading was 10:1 by weight, and the experiment was conducted at 650° C.

As shown in FIG. 5, through the addition of both calcium sorbent and carbonaceous material nearly all the NO, $SO_2$, and $CO_2$ was removed from the outlet for approximately 37 minutes. At such time the sorbent and coal char became saturated, allowing the $CO_2$ and NO to pass through the fixed bed unreacted. As illustrated by this experiment, the addition of both calcium sorbent and carbonaceous material into the carbonator provides for the simultaneous removal of NO, $SO_2$, and $CO_2$ from a gas mixture such as a flue gas stream of a power plant.

While certain embodiments of the present invention are described in detail above. The scope of the invention is not to be considered limited by such disclosure, and modifications are possible without departing from the spirit of the invention as evidenced by the following claims.

What is claimed is:

1. A method of removing unwanted components of a gas mixture, comprising:
   providing a carbonator;
   directing said gas mixture into said carbonator;
   introducing a carbonaceous material and calcium sorbent into said carbonator;
   removing $CO_2$, $SO_x$, and $NO_x$ from said gas mixture simultaneously in said carbonator;
   providing a calciner in communication with said carbonator;
   regenerating said calcium sorbent in said calciner; and
   using an unreacted portion of said carbonaceous material as fuel for said calciner.

2. The method of claim 1, further comprising operating said carbonator in a range of about 500 to about 700° C.

3. The method of claim 1, further comprising operating said calciner at a temperature of greater than 850° C.

4. The method of claim 1, further comprising:
   providing a hydrator;
   directing regenerated sorbent from said calciner to said hydrator; and
   hydrating said regenerated sorbent.

5. The method of claim 4, further comprising operating said hydrator at a temperature greater than 350° C.

6. The method of claim 1, further comprising providing a first particle collection device for the separation of a clean flue gas stream.

7. The method of claim 1, further comprising providing a second particle collection device for the separation of a high-purity $CO_2$ stream from the regenerated sorbent from said calciner.

8. A method of removing unwanted components of a gas mixture, comprising:
   providing a carbonator, a calciner, and a hydrator;
   directing said gas mixture into said carbonator;
   introducing a carbonaceous material into said carbonator;
   directing a calcium sorbent into said carbonator, said calcium sorbent is CaO;
   reacting said carbonaceous material and said calcium sorbent with said gas mixture in said carbonator to simultaneously remove $CO_2$, $SO_x$, and $NO_x$ from said gas mixture, resulting in a clean flue gas stream and solids;
   directing said clean flue gas stream and said solids to a first particle collection device provided downstream of said carbonator;
   separating a clean flue gas stream from said solids in said first particle collection device, said solids comprising, $CaCO_3$, $CaSO_4$, unreacted carbonaceous material, and unreacted calcium sorbent;
   directing said solids from said first particle collection device to said calciner;
   calcining said solids to produce to produce a high-quality $CO_2$ stream and said calcium sorbent;
   using said unreacted portion of said carbonaceous material as fuel for said calciner;
   directing said high-quality $CO_2$ stream and said calcium sorbent to a second particle collection device;
   separating said high-purity $CO_2$ stream and said calcium sorbent;
   directing said calcium sorbent to a hydrator;
   hydrator said calcium sorbent in said hydrator; and
   directing said sorbent from said hydrator to said carbonator.

9. The method of claim 8, further comprising operating said carbonator in a range of about 500 to about 700° C.

10. The method of claim 8, further comprising operating said calciner at a temperature of greater than 850° C.

11. The method of claim 8, further comprising operating said hydrator at a temperature greater than 350° C.

12. The method of claim 8, further comprising mixing said carbonaceous material and said calcium sorbent before introduction to said carbonator.

13. A method of removing unwanted components of a gas mixture, comprising:
   introducing a carbonaceous material and a calcium sorbent into a carbonator;
   introducing a gas mixture into said carbonator;
   reacting said gas mixture with said carbonaceous material and said calcium sorbent in said carbonator to simultaneously remove $CO_2$, $SO_x$, and $NO_x$ from said gas mixture;
   directing solid products from said carbonator to a provided calciner;
   using an unreacted portion of said carbonaceous material as fuel for said calciner; and
   calcining a portion of said solid products to form a regenerated calcium sorbent.

14. The method of claim 13, further comprising operating said carbonator in a range of about 500 to about 700° C.

15. The method of claim 13, further comprising operating said calciner at a temperature of greater than 850° C.

16. The method of claim 13, further comprising:
   providing a hydrator;
   directing regenerated calcium sorbent from said calciner to said hydrator; and
   hydrating said regenerated sorbent.

17. The method of claim 16, further comprising operating said hydrator at a temperature greater than 350° C.

18. The method of claim 13, further comprising providing a first particle collection device for the separation of a clean flue gas stream.

19. The method of claim 13, further comprising providing a second particle collection device for the separation of a high-purity $CO_2$ stream from the regenerated calcium sorbent.

* * * * *